United States Patent Office 3,811,980
Patented May 21, 1974

3,811,980
PROCESS FOR MIXED SOLVENT PRIMING AND CEMENTING OF PRESSURE PIPES OF POLYVINYL CHLORIDE
Bernhard Roderhoff, Dusseldorf-Holthausen, Germany, assignor to Henkel & Cie GmbH, Dusseldorf-Holthausen, Germany
No Drawing. Filed May 3, 1972, Ser. No. 250,036
Claims priority, application Germany, May 26, 1971,
P 21 26 081.1
Int. Cl. C09j 5/02; F16l 13/10
U.S. Cl. 156—308
2 Claims

ABSTRACT OF THE DISCLOSURE

In the process for the cementing of polyvinyl chloride pipes, which comprises the steps of applying a coating consisting of polyvinyl chloride dissolved in a solvent to the pipe surfaces to be cemented, joining the coated pipe surfaces to each other, and drying off the solvent; the improvement which comprises treating the surfaces to be cemented, prior to their actually being coated with said coating, with a mixture consisting essentially of (a) 90 parts by volume of butanone, (b) 3 to 20 parts by volume of cyclohexanone and (c) 0 to 3 parts by volume of tetrahydrofuran.

PRIOR ART

It is customary to clean PVC pipes, which are to be cemented together, before cement is applied to the pipes. The cement is usually comprised substantially of polyvinyl chloride, dissolved in solvents. After removal of crude impurities from the pipe, the pipe is then cleaned off with solvents, such as trichloroethylene, ethyl acetate, ethyl alcohol, isopropyl alcohol, mineral spirits or the like. Particularly effective for the cleaning are methylene chloride or butanone. In some pipes this pre-treatment is not sufficient to achieve a durable bond. It has further been known to coat the surfaces to be cemented, a sufficient number of times with tetrahydrofuran, until they are distinctly swollen. Such a pre-treatment has to be carried out, however, very frequently. Thus considerable amounts of the relatively volatile tetrahydrofuran evaporate and are wasted.

OBJECTS OF THE INVENTION

It is an object of the present invention to provide a process which makes it easy to cement pipes of PVC together in a single treatment, which have previously been very difficult to cement together even after many treatments.

It is a further object of the present invention to provide a development in the process for the cementing of polyvinyl chloride pipes, which comprises the steps of applying a coating consisting of polyvinyl chloride dissolved in a solvent to the pipe surfaces to be cemented, joining the coated pipe surfaces to each other, and drying off the solvent; wherein the improvement comprises treating the surfaces to be cemented, prior to their actually being coated with said coating, with a solvent mixture consisting essentially of (a) 90 parts by volume of butanone, (b) 3 to 20 parts by volume of cyclohexanone and (c) 0 to 3 parts by volume of tetrahydrofuran.

These and other objects of the invention will become apparent as the description thereof proceeds.

DESCRIPTION OF THE INVENTION

The present invention is directed to a development in the process for the cementing of polyvinyl chloride pipes, which comprises the steps of applying a coating consisting of polyvinyl chloride dissolved in a solvent to the pipe surfaces to be cemented, joining the coated pipe surfaces to each other, and drying off the solvent; wherein the improvement comprises treating the surfaces to be cemented, prior to their actually being coated with said coating, with a solvent mixture consisting essentially of (a) 90 parts by volume of butanone, (b) 3 to 20 parts by volume of cyclohexanone and (c) 0 to 3 parts by volume of tetrahydrofuran.

In carrying out the process of the present invention, the surfaces to be cemented together are dried in a known manner and are optionally scraped with clean absorbent paper. The paper used for scraping can also be soaked with other volatile solvents.

The surfaces to be cemented together are pre-treated with the solvent mixture of the invention, by applying this mixture with the use of clean absorbent paper. The solvent mixture may also be brushed onto these surfaces with a brush.

Immediately thereafter a cement containing dissolved polyvinyl chloride is applied to the pre-treated, still moist surface. In some cases, it is preferred to wait until the surfaces to be cemented appear dry. Also in this case, residues of the solvent mixture to be applied according to the invention are still present. Such known cements contain mostly mixtures of tetrahydrofuran, dimethylformamide and optionally cyclohexanone. Fillers are also frequently present. After the pipes or fittings have been coated with the cement, these coated pipes or fittings are then shoved into each other. This joining is preferably done while the coating is still in a moist state.

If the pipes to be joined together are of the same outside diameter, joining is accomplished by placing the ends of these pipes in abutting contact and then placing a fitting of slightly greater diameter around these ends. On the other hand, if the pipes to be joined together are of unequal outside diameters, then joining is achieved by inserting the end of the smaller diameter pipe into the end of the larger diameter pipe. In all cases, the pipe ends have a cemented overlapping interface and joint of the customary length.

By means of the present invention, it is possible to cement PVC-pipe from 10 to 500 mm. diameter. These cemented articles can be utilized particularly for pressure pipes and can carry a load, according to DIN 16/970, of water at 20° C. for over 1,000 hours at 52 atmospheres absolute pressure (at. abs. pr.).

Because of the very great strength of these cemented articles, it is possible to utilize them as drinking-water lines or gas lines, as well as for drain lines that carry away acids or bases.

The following examples are merely illustrative of the present invention without being deemed limitative in any manner thereof.

Examples

Hard PVC pipes with a diameter of 40 or 63 mm. were cemented together with a cement, which had the following composition:

700 gm. of tetrahydrofuran
40 gm. of cyclohexanone 40 gm. of dimethylformamide
10 gm. of finely dispersed silica
200 gm. of polyvinyl chloride (K-value 59)

The pipe ends, to be cemented, were first rubbed dry with a cloth and were subsequently coated by having a respective mixture selected from A to E in Table I, brushed onto the pipe ends. The numbers shown are the respective volume in cc. of each component.

TABLE I

| Mixture | Butanone | Cyclohexanone | Tetrahydrofuran |
|---|---|---|---|
| A | 900 | 180 | |
| B | 900 | 100 | |
| C | 900 | 50 | |
| D | 900 | 120 | 10 |
| E | 900 | 80 | 30 |

The pipes were cemented to the respective fittings. The insertion depth for the pipes of 40 mm. diameter was 31 mm., while the insertion depth for the pipes of 63 mm. diameter was 37.5 mm. This overlapping corresponds to DIN 8063.

After the cementing had been completed, the pipes were subjected to a loading with water at 20° C., according to DIN 16/970. All the cemented pipes sustained the load of 52 at. abs. pr. during 1,000 hours.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

I claim:
1. In the process for the cementing of polyvinyl chloride pipes, which comprises the steps of applying a coating consisting of polyvinyl chloride dissolved in a solvent to the pipe surfaces to be cemented, joining the coated pipe surfaces to each other, and drying off the solvent; the improvement which consists essentially of treating the surfaces to be cemented, prior to their actually being coated with said coating, with a solvent mixture consisting essentially of (a) 90 parts by volume of butanone, (b) 3 to 20 parts by volume of cyclohexanone and (c) 0 to 3 parts by volume of tetrahydrofuran.
2. The process of claim 1, wherein ingredient (c) of the mixture is 1 to 3 parts by volume of tetrahydrofuran.

References Cited

UNITED STATES PATENTS

| | | | |
|---|---|---|---|
| 2,739,829 | 3/1956 | Pedlow et al. | 156—306 X |
| 3,002,534 | 10/1961 | Noland | 138—141 |
| 3,654,008 | 4/1972 | Rogers et al. | 156—152 |

OTHER REFERENCES

McKinney, "Equivalence of Cyclohexanone and Tetrahydrofuran as Solvents for Poly(vinyl Chloride)," Journal of Applied Polymer Science, vol. 9, No. 6 (1965), pp. 2319–2320.

DOUGLAS I. DRUMMOND, Primary Examiner
R. A. DAWSON, Assistant Examiner

U.S. Cl. X.R.

156—314, 333; 161—256; 285—423